US010286574B2

(12) United States Patent
Guha et al.

(10) Patent No.: US 10,286,574 B2
(45) Date of Patent: May 14, 2019

(54) FIBER MOLDING PREFORM COMPOSITION AND PROCESS FOR PREFORM FORMATION

(71) Applicant: Continental Structural Plastics, Inc., Auburn Hills, MI (US)

(72) Inventors: Probir Kumar Guha, Troy, MI (US); Kim Robert Hamner, Auburn Hills, MI (US); Joseph A. Bodary, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 349 days.

(21) Appl. No.: 14/764,431

(22) PCT Filed: Jan. 29, 2014

(86) PCT No.: PCT/US2014/013637
§ 371 (c)(1),
(2) Date: Jul. 29, 2015

(87) PCT Pub. No.: WO2014/120798
PCT Pub. Date: Aug. 7, 2014

(65) Prior Publication Data
US 2015/0375422 A1 Dec. 31, 2015

Related U.S. Application Data

(60) Provisional application No. 61/757,913, filed on Jan. 29, 2013.

(51) Int. Cl.
*B29K 1/00* (2006.01)
*C08J 5/04* (2006.01)
(Continued)

(52) U.S. Cl.
CPC .............. *B29B 11/06* (2013.01); *B29B 11/16* (2013.01); *B29B 13/02* (2013.01); *B29B 13/08* (2013.01);
(Continued)

(58) Field of Classification Search
CPC ........................................................ D21J 7/00
(Continued)

(56) References Cited

U.S. PATENT DOCUMENTS 2,124,745 A * 7/1938 Morgan ................ F16L 59/021
162/384
3,288,707 A 11/1966 Hurwitz et al.
(Continued)

FOREIGN PATENT DOCUMENTS

FR 2511399 A1 2/1983
GB 2106029 A * 4/1983 ................ D21J 7/00
(Continued)

OTHER PUBLICATIONS

Wood, Karen. "Microspheres: Fillers Filled With Possibilities." CompositesWorld. Apr. 1, 2008.*
(Continued)

*Primary Examiner* — Matthew J Daniels
*Assistant Examiner* — Hana C Page
(74) *Attorney, Agent, or Firm* — Avery N Goldstein; Blue Filament Law PLLC

(57) ABSTRACT

A preform for thermoset resin composition molding is provided that upon cure forms a variety of molded and fiber reinforced articles used in a variety of applications such as vehicle components including bed lines, body components, trim, interior components, and undercar components; architectural components such as trim and doors, marine components including hulls, trim, and cockpit pieces; and similar structures in aerospace settings. A novel slurry composition,
(Continued)

a novel centrifugal process, or a combination thereof provide superior quality preforms that are created with greater throughput relative to conventional techniques. The inhibition of fiber movement between the time such a fiber contacts the mold, or fibers already in place on the mold, and the time the fibers are set in position provides a superior fiber homogeneity and randomized orientation relative to existing slurry techniques with attributes of low scrap generation, and process flexibility with respect to part shape and fiber material.

22 Claims, 1 Drawing Sheet

(51) Int. Cl.
  B29B 11/06 (2006.01)
  B29B 11/16 (2006.01)
  B29B 13/02 (2006.01)
  B29B 13/08 (2006.01)
  B29K 29/00 (2006.01)
  B29K 73/00 (2006.01)
  B29K 401/00 (2006.01)
  B29K 503/04 (2006.01)
(52) U.S. Cl.
  CPC ............... *C08J 5/042* (2013.01); *C08J 5/043* (2013.01); *C08J 5/045* (2013.01); *B29K 2001/00* (2013.01); *B29K 2029/04* (2013.01); *B29K 2073/00* (2013.01); *B29K 2401/00* (2013.01); *B29K 2503/04* (2013.01); *C08J 2339/04* (2013.01)
(58) Field of Classification Search
  USPC .......................................... 264/503; 162/384
  See application file for complete search history.

(56) References Cited

U.S. PATENT DOCUMENTS

| | | | |
|---|---|---|---|
| 3,617,437 A | | 11/1971 | Bagg et al. |
| 3,909,346 A | * | 9/1975 | Winters ................. D21H 13/42 162/155 |
| 4,016,031 A | | 4/1977 | Bagg et al. |
| 4,022,734 A | | 5/1977 | Rasicci et al. |
| 4,178,207 A | * | 12/1979 | Oversohl ................ C06B 21/00 162/219 |
| 4,254,823 A | | 3/1981 | Cederqvist et al. |
| 4,271,112 A | | 6/1981 | Rossman et al. |
| 4,849,147 A | | 7/1989 | Freeman |
| 5,013,405 A | * | 5/1991 | Izard ....................... C04B 26/02 162/101 |
| 5,039,465 A | * | 8/1991 | Freeman ................. B29B 11/16 162/116 |
| 5,545,450 A | | 8/1996 | Andersen et al. |
| 6,086,720 A | | 7/2000 | Bodary et al. |
| 6,090,195 A | * | 7/2000 | Andersen ............ B28B 23/0087 106/162.51 |
| 6,291,552 B1 | | 9/2001 | Dong et al. |
| 7,678,307 B1 | | 3/2010 | Geiger |
| 8,343,410 B2 | * | 1/2013 | Herbeck ............... B29C 70/025 264/427 |
| 2004/0000734 A1 | * | 1/2004 | Kapphan ............... B29C 70/326 264/29.1 |
| 2007/0141108 A1 | | 6/2007 | Thomas et al. |
| 2011/0268915 A1 | * | 11/2011 | Zhang ..................... C08H 1/00 428/106 |
| 2012/0067514 A1 | * | 3/2012 | Hull ........................ B29C 70/12 156/245 |
| 2014/0048984 A1 | * | 2/2014 | Enomura ............ B01F 7/00775 264/503 |

FOREIGN PATENT DOCUMENTS

| | | | |
|---|---|---|---|
| JP | 06002008 A | | 1/2008 |
| JP | 2008138039 A | | 6/2008 |
| WO | 066835 A1 | | 11/2000 |
| WO | 0125214 A1 | | 4/2001 |

OTHER PUBLICATIONS

Abdelmouleh et. al. "Modification of cellulosic fibres with functionalised silanes: development of surface properties." International Journal of Adhesion & Adhesives 24 (2004) 43-54.*

Ruckenstein et. al. "Cellulose and Glass Fiber Affinity Membranes for the Chromatographic Separation of Biomolecules." Biotechnol. Prog. 2004, 20, 13-25.*

"SIDS Initial Assessment Report: 3-aminopropyltriethoxysilane (APTES)".*

Supplementary European Search Report dated Jan. 23, 2017 for European Application No. 14745550 filed Jan. 29, 2014.

* cited by examiner

FIBER MOLDING PREFORM COMPOSITION AND PROCESS FOR PREFORM FORMATION

RELATED APPLICATIONS

This application claims priority benefit of U.S. Provisional Application Ser. No. 61/757,913 filed Jan. 29, 2013; the contents of which are hereby incorporated by reference.

FIELD OF THE INVENTION

The present invention in general relates to fiber reinforced thermoset preforms and, more particularly, to a process and apparatus for controlling fiber deposition in a fiber preform.

BACKGROUND OF THE INVENTION

A fiber filler is typically added to a thermoset resin such as those used in sheet molding compounds (SMC) or bulk molding compounds (BMC) in order to provide a variety of adjustable properties for the resulting article. Fillers are routinely added to reduce article cost, modify viscosity of pre-cured loaded resins, control article shrinkage, control surface finish, density, flammability, electrical conductivity, chemical resistance, and strength of the resulting thermoset formulation. Particulate fillers typically account for amounts ranging from 0-80 total weight percent with typical particle filler sizes ranging from 0.1 to 50 microns. In addition to particulate fillers, fiber fillers are typically present in a thermoset resin formulation to provide enhanced strength to the resulting article relative to particulate filler. Fiber fillers have traditionally included glass, carbon, polyimides, polyesters, polyamides, and natural fibers such as cotton, silk, and hemp. Optimal three-dimensional strength in such an article when the reinforcing fibers are randomly oriented within the cured polymer matrix.

As a thermoset resin with fiber reinforcement has attractive properties in terms of high strength to weight ratios and the ability to form a stress skin construct, SMCs have long been considered in automotive and aerospace applications as an alternative to metal body components. While there have been numerous attempts to develop models to create preforms, these have generally relied on a process of catching fibers from a slurry on a screen contoured in the shape of the desired preform, followed by a secondary drying to set the shape of the preform. Thermoplastic binders have been used in concert with heat to set the fibers in the preform shape. The preform is then subjected to optional trimming and impregnated with reactive resin through a reaction injection molding process to form a composite article. A molding technique is detailed, for example, in U.S. Pat. No. 4,849,147. A lifting screen preform mold process and apparatus is provided for example in U.S. Pat. No. 6,086,720.

To obtain reliable quality articles for automotive and other high stringency applications, it is important the fiber preforms have piece-to-piece constituency and a uniform fiber density within various regions of a preform. Typically, preforms tend to accumulate excess fibers proximal to edges while the center regions tend to be fiber deficient. This inhomogeneity in fiber density and also a degree of undesirable fiber preferential orientation are caused by fiber movement between contact with the preform mold screen and preform set of fiber position. While glass fibers are observed to have a nominal degree of fiber aggregation in a slurry that leads to the formation of an oriented clump of fibers being formed in a preform, these tendencies towards aggregation are more pronounced for other types of fibers such as carbon fibers and cellulosic-based fibers. While variant techniques have been explored, problems persist with slurry preform formation associated with limited throughout, and inhomogeneity of fiber densities within a preform.

Thus, there exists a need for a fiber slurry composition and an apparatus to achieve a greater degree of uniformity in fiber density in slurry derived preform. There also exists a need for a process of forming preforms with greater throughput than obtained with a tank immersion screen mold.

SUMMARY OF THE INVENTION

A slurry preform composition includes a plurality of fibers having an average fiber length and fiber diameter; a dispersing agent molecule or monomer having the general formula $(R^1)_2$—C=N—$R^2$ or R3-pyrrolidines, $(R^1)_2$—C=N—$R^2$ or $R^3$-pyrrolidines, where $R^1$ in each instance is independently H, $C_1$-$C_6$ alkyl, $C_1$-$C_6$ alkenyl, and $C_1$-$C_6$ alkyl having a substituent, the substituent being H, OH, COOH, NH2, NH $C_1$-$C_6$ alkyl or $R^1$ in both instances are contented to form a 5 or 6 member ring structure; $R^2$ is $C_1$-$C_6$ alkyl, OH, and $C_1$-$C_6$ alkyl having a substituent, the substituent being H, OH, COOH, $NH_2$, NH($C_1$-$C_6$ alkyl); or $R^1$ and $R^2$ combine to form a 5 or 6 member ring structure and $R^3$ is H, $C_1$-$C_6$ alkyl, C1-C6 carboxyl, $C_1$-$C_6$ hydroxyl, or $C_1$-$C_6$ $NH_2$. and a solvent forming a slurry of said plurality of fibers and the dispersing agent.

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1:
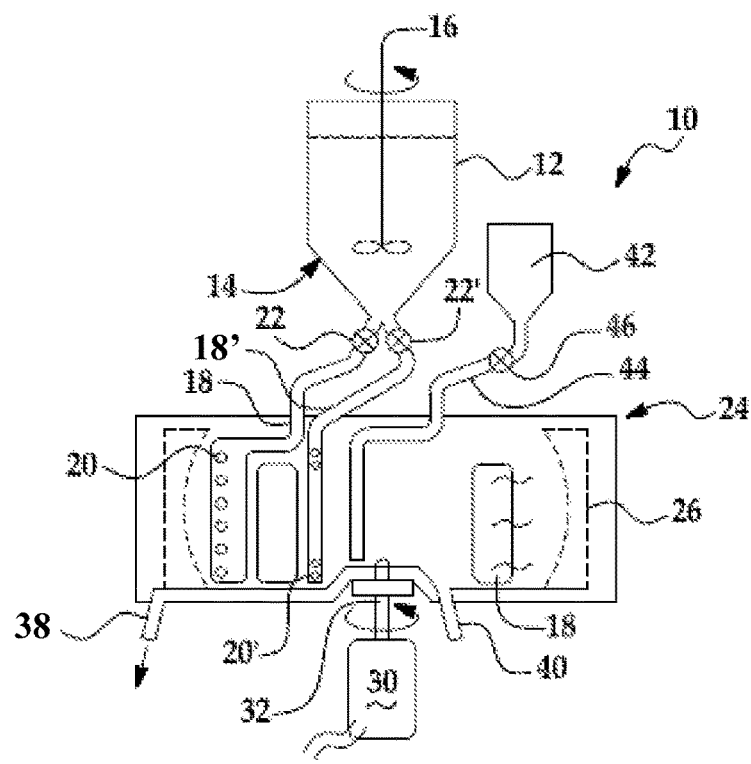
FIG. 1 is a schematic partial longitudinal cutaway view of an inventive system apparatus for creating fiber preforms.

The present invention has utility as a preform for thermoset resin composition molding that upon cure forms a variety of molded and fiber reinforced articles. Such articles are used in a variety of applications such as vehicle components such as bed lines, body components, trim, interior components, and undercar components; architectural components such as trim and doors, marine components such as hulls, trim, and cockpit pieces; and similar structures in aerospace settings. It has been found that through resort to a novel slurry composition, a novel centrifugal process, or a combination thereof that superior quality preforms are created with greater throughput relative to conventional techniques. It has been surprisingly found that the inhibition of fiber movement between the time such a fiber contacts the mold, or fibers already in place on the mold, and the time the fibers are set in position provides a superior fiber homogeneity and randomized orientation relative to existing slurry techniques. The present invention has the attributes of low scrap generation, process flexibility with respect to part shape and fiber material.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In one embodiment of the present invention, a slurry is formed that includes a source of fibers of a given diameter that have been cut to a predetermined length; the fibers being in a solvent along with additives. The additives including a dispersing agent, particulate fillers to promote drying, binders, or a combination thereof. An inventive slurry applied using a conventional preform system or used with an inventive centrifugal preform system.

A solvent for an inventive slurry is largely dictated only by handling properties and compatibility with mold form materials, fibers, and slurry additives. Solvents operative herein illustratively include water, $C_1$-$C_{12}$ alcohols, toluene, ($C_1$-$C_6$ alkyl)-$C_1$-$C_6$ esters, $(C_1$-$C_6)_2$C=O ketones, and miscible combinations thereof. In order to comply with limits on volatile organic content (VOC) and waste treatment, in certain inventive embodiments, the slurry is aqueous. As will be detailed hereafter, a self-contained slurry is also provided with solvent recycle thereby obviating concerns about solvent VOC content and handling.

Fibers operative in an inventive slurry composition include glass; carbon; polyimides; polyesters; polyamides and natural fibers such as hemp, cane, bamboo, jute, straw, silk, straw sawdust, nutshells, grain husks, grass, palm frond, coconut husk, coconut fiber; and combinations thereof. Typical lengths of fibers used in preform formation typically range from 0.05 to 5 centimeters (cm). The diameters of fibers are appreciated to vary widely based on commercial sources with glass fibers having typical diameters of 0.03 to 0.5 millimeters (mm); carbon fibers having typical diameters of 0.005 to 0.1 mm; and natural fibers having typical diameters of 0.01 to 0.3 mm. It should be appreciated that fiber dimensions outside of the aforementioned typical ranges exist and are intended to be within the scope of the present invention.

The use of hydrophobic fibers in a water based slurry is promoted in the present invention by inclusion of a dispersing agent that serves to debundle and otherwise create randomized and individual dispersed fibers include small molecules or monomers with a molecular weight of less than 500 atomic mass units and having the general formula $(R^1)_2$—C=N—$R^2$ or $R^3$-pyrrolidines, where $R^1$ in each instance is independently H, $C_1$-$C_6$ alkyl, $C_1$-$C_6$ alkenyl, and $C_1$-$C_6$ alkyl having a substituent, the substituent being H, OH, COOH, $NH_2$, NH $C_1$-$C_6$ alkyl or $R^1$ in both instances are contented to form a 5 or 6 member ring structure; $R^2$ is $C_1$-$C_6$ alkyl, OH, and $C_1$-$C_6$ alkyl having a substituent, the substituent being H, OH, COOH, $NH_2$, NH $C_1$-$C_6$ alkyl; or $R^1$ and $R^2$ combine to form a 5 or 6 member ring structure and $R^3$ is H, $C_1$-$C_6$ alkyl, $C_1$-$C_6$ carboxyl, $C_1$-$C_6$ hydroxyl, or $C_1$-$C_6$ $NH_2$. Exemplary molecular dispersing agent include imidazoline, guanidine, oximes, and proline. Exemplary polymeric dispersing agents include polymeric imidazolines such as those detailed in U.S. Pat. No. 3,288,707 including those based on a 2-vinyl imidazoline. A dispersing agent in typically present in a fully formulated slurry from 0.01 to 1 total weight percent.

A dispersing agent for natural cellulosic fibers includes a conventional ionic surfactant, or a colloidal filler supporting an ionic charge. Such fillers illustratively include colloidal silica, calcium carbonate, mica, clays, and combinations thereof. Colloidal fillers typically have a diameter of between 0.001 and 3 times the diameter of the natural fibers present in the slurry.

To facilitate a rapid build in viscosity as the solvent is removed from an inventive slurry, a polymeric binder is provided in certain embodiments. The binder limits the ability of fibers to migrate under the forces of drying as water or other solvent is removed from slurry on a mold surface. Binders operative herein in aqueous based slurries illustratively include lignosulfonates; proteins such as albumin; polyethylene glycols and especially those with molecular weights of between 600 and 1000; polyvinyl alcohols, pectins, and alkylated celluloses, and combinations thereof. Binders for hydrophobic slurries illustratively include polyvinylpyrrolidones, polystyrenes, and combinations thereof. A binder is typically present in an amount of up to 1 total weight percent of a slurry.

An inventive slurry in some embodiments also includes a filler that promotes rapid drying of the preform by thermal exposure. The thermal conductivity of conventional SMC is about 0.3 to 0.7 W/m-K; glass and natural fibers are also low thermal conductivity. High thermal conductivity fillers operative herein illustratively include carbon fibers with values of 8-70 W/m-K (pan) and 20-1000 W/m-K (pitch), AlN 260 W/m-K, BN 300 W/m-K, graphite 600 W/m-K, or carbon black, alumina, or combinations thereof. It is appreciated that carbon fiber based slurries already have high thermal conductivity values and need not be added to slurries were these are the predominant fiber. It should also be apparent that the inclusion of binary fillers tends to increase the density of the resultant SMC such that in applications where overall article density is to be minimized, such fillers are used in limited amounts. Incorporating fillers with paramagnetic properties in the fiber matrix allows the preform to be heated rapidly by induction heating for rapid cure cycles and for improved fiber wet-out. The paramagnetic properties keeps preforms from overheating above the Curie Temperature of the paramagnetic particle. Paramagnetic fillers of gadolinium and $CrO_2$ with Curie temperature of 292 and 386 Kelvin, respectively are used, each alone or in combination to promote self-limiting induction heating. High thermal conductivity fillers or paramagnetic fillers are present in an inventive slurry from 0.0001 to 1 total weight percent of the slurry.

An inventive slurry in some embodiments also includes additional additives to facilitate slurry handling and storage. Such additional additives include chelating agents, antimicrobials, antifoaming agents, antistatic agents, and combinations thereof. Such additional additives, if present, a typically individually present in a slurry from 0.00001 to 0.01 total weight percent of the fully formulated slurry.

Figure 2:
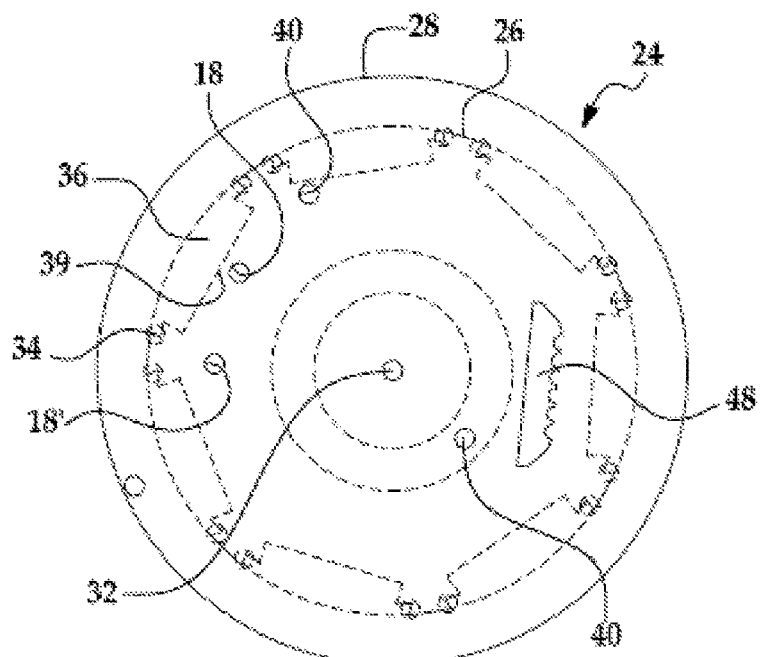
FIG. 2 is a transverse cross-sectional view of a centrifuge of the inventive systems depicted in FIG. 1.

While an inventive slurry is used on a conventional preform apparatus to good effect, a system is also provided that reduces the footprint of a slurry tank and apparatus while achieving higher throughput and control of the preform process. An inventive system is illustrated with respect to FIGS. 1 and 2 and shown generally at 10. A slurry tank 12 is provided that contains conventional fiber slurry, or an inventive slurry as detailed herein. An air bubbler 14, mechanical agitator 16 or a combination thereof is provided to keep the slurry in tank 12 homogeneous and the contained fibers and filler, if present, well dispersed. The slurry in the tank 12 is in fluid communication with one or more outlet manifolds 18 and 18'. The outlet manifolds 18 and 18' have a series of apertures 20 and 20' that upon opening of valves 22 and 22', respectively releases slurry into the interior of a basket centrifuge, shown generally at 24. It is appreciated that the apertures 20 can vary in size along the length of the outlet manifold 18 or 18'. In certain embodiments, such as that shown form manifold 18, the apertures 20 increase in size as distal distance from the valve 22 increases to account for a pressure drop associated with more proximal apertures and thereby produce a more uniform distribution of slurry along the length of the manifold 18. Apertures 20' are shown in only limited regions of the length of the manifold 18' to apply additional slurry as desired to thicken specific portions of a resulting preform. It is appreciated that a single opening, especially an elongated opening or a manifold that vertical moves to deliver slurry are also operative herein. The centrifuge 24 has a basket 26 mounted within a stationary housing 28. A motor 30 is concentrically mounted to the basket 26 via a spindle 32 to induce rotary movement of the basket 26. The basket 26 has a series of slots 34 spaced to accommodate multiple rotationally balanced perform molds 36. The molds 36 are porous to allow the slurry solvent to pass therethrough and retain fibers, filler, if present, and additives coating the fibers and fillers on the mold surface 39. The mold surface 39 has dimensions complementary to the desired preform. A fluid communication channel is formed from the apertures 20 or 20' through a mold 36 external to the basket 26 to a solvent drain 38. While the regions of the basket 26 between adjacent mounting slot pairs is depicted in FIG. 2 as being solid, it is appreciated that these basket regions between molds 36 in some embodiments are also in fluid communication with the drain 38. In instances when the basket regions between molds 36 is solid, a fiber drain 40 is provided from the interior of the basket 26 to facilitate recycle of fiber that is not retained on a mold 36.

In some embodiments of a system 10, a reservoir 42 is provided in fluid communication with feed tube 44 to allow for the application of an additional material to a mold 36. It is appreciated that the additional material is readily applied before, during, or subsequent to the slurry application. Materials so applied illustratively include mold release agents, separate binders, dewatering agents, fillers, and combinations thereof. It is appreciated that through control of valves 22, 22', and 46 that pulsed sequences of additives and slurry are applied to a mold 36 to create preforms with controlled drying and strength properties that are especially desirable in deep draw molds for highly contoured articles. It should also be noted that the material from reservoir 42 is also applied in a controlled manner onto only a mold surface 39 or a preform on the mold surface 39 by not rotating the motor 30 during this application step. This is advantageous to limit waste and facilitate recycle of fibers via drain 40.

A material from reservoir 42 illustratively includes a substance that pre-treats natural cellulosic fillers to reduce hydrophilic behavior of the natural cellulosic fillers after being dispensed from a slurry and before exposure to an SMC thereby rendering such fillers more compatible with the generally hydrophobic monomers and oligomers that are used in thermoset formulations that upon cure form SMC or BMC articles. Through reducing the hydrophilic nature of natural cellulosic fillers, the environmental burden of producing such articles is reduced while the properties of the resultant article relative to identically formed articles save for the pretreatment of the natural cellulosic fillers is improved. Density decreases through inclusion of inventive fillers are greater than 0.1 units of density and in some embodiments between 0.1 and 0.4 units based on replacement of higher density inorganic fillers. As a result, articles are readily formed with a density of between 1.1 and 1.5, where density is in units of grams per cubic centimeter. According to the present invention, the hydrophilic nature of natural cellulosic fillers is reduced through pretreatment with a silsesquioxane (SQ), an isocyanate, treatment with an organic acid or a base, or combinations thereof.

A lower density SMC is also provided when the material includes hollow glass microsphere having an outer diameter of between 10 and 40 microns. Alternatively, other fillers such as plastic particulate is interspersed with the fibers being deposited on the mold surface 39 to create a large open volume network that facilitates SMC penetration therein.

Still another material particularly well suited to enhance the strength of articles containing surface hydroxyl groups such as natural cellulosics, glass fibers, and glass microspheres is a surface activating agent that bonds to the hydrophilic hydroxylated surface. The surface activating agent in certain embodiments is an alkoxysilane where the silane is reactive with the with hydroxyl functionality on the surface of the fiber or microsphere. The surface activating agents for the silica and glass fibers illustratively include: 3-aminopropyltrimethoxysilane, 3-aminopropyltriethoxysilane, 3-glycidoxypropyltrimethoxysilane, 3-glycidoxypropyltriethoxysilane, (3-glycidoxypropyl)bis(trimethylsiloxy) methylsilane, (3-glycidoxypropyl)methyldiethoxysilane, (3-glycidoxypropyl)dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl) tetrasulfide, and combinations thereof. In other embodiments, the silane surface activating agent includes an unsaturated that is reactive under free radical crosslinking conditions so as to covalently bond with the hollow glass microsphere to the surrounding SMC or BMC matrix.

In still other embodiments of the present invention where the slurry contains a protein binder, the material includes glutaraldehyde to promote protein crosslinking to build preform strength in a material of seconds by forming a proteinaceous matrix.

In some embodiments of the present invention, a vacuum is drawn in the region exterior to the basket 26 and within the housing 28 to promote solvent draw through the molds 36. In still other embodiments, a dryer 48 is provided. The dryer 48 illustratively including an infrared lamp, a hot air exhaust manifold, a resistively heated element, or combinations thereof.

In operation, the basket is rotated at a speed relative to slurry release from manifolds 18 or 18' to limit fiber movement after contacting the mold surface 39. It is appreciated that vacuum draw exterior to the basket 26 is factor in the speed of rotation and slurry metering. Slurry is metered from manifold 18 and manifold 18', if present, to build up a preselected thickness of fibers and other slurry additives. Other materials are also applied through feed tube 44 as desired until a compositional desired preform is produced. Dryer 48 is then activated to reduce the solvent level of the preform on the mold surface 39 to a preselected level of strength.

In some embodiments of the present invention, a mold 36 is then removed from the basket 26 and subject to additional treatment such as placement in a heating chamber remote from the centrifuge 24 or cleaning. A new mold is then placed in the slots 34 and a new batch of performs are then produced.

Any patents or publications mentioned in this specification are herein incorporated by reference to the same extent as if each individual publication was specifically and individually indicated to be incorporated by reference.

The foregoing description is illustrative of particular embodiments of the invention, but is not meant to be a limitation upon the practice thereof.

The invention claimed is:

1. A process for producing a plurality of vehicle component preforms in a single run, said process comprising:
   inserting a plurality of solvent porous preform molds into a series of slots formed in a basket of a centrifuge;
   rotating said basket within a stationary housing;
   metering a slurry containing a solvent and fibers onto a surface of each of said preform molds to draw said solvent through said preform molds and retain said fibers on the surface;
   applying a material to said preform molds or said plurality of vehicle component preforms from a reservoir separate from said slurry; and
   drying said preform molds until said fibers are dry to define said vehicle component plurality of preforms each having a preselected preform strength.

2. The process of claim 1 wherein the slurry is metered through a manifold of apertures.

3. The process of claim 2 wherein the apertures vary in area as a function of distance from a tank containing said slurry.

4. The process of claim 1 further comprising drawing a vacuum external to said basket of said centrifuge.

5. The process of claim 1 wherein drying is with at least one of hot air, resistive heating and radiation.

6. The process of claim 1 wherein said plurality of solvent porous preform molds are slidably inserted into said series of slots formed in said basket.

7. The process of claim 1 further comprising removing said plurality of solvent porous preform molds from said basket and further heating said preforms thereon remote from said centrifuge.

8. The process of claim 1 wherein said slurry is applied to said mold in a first region at a first fiber density and in a second region at a second fiber density that varies from the first fiber density.

9. The process of claim 1 wherein the material is a binder.

10. The process claim 1 wherein the material is a filler.

11. The process of claim 10 wherein the filler is hollow glass microspheres.

12. The process of claim 10 wherein the filler is paramagnetic filler.

13. The process of claim 1 wherein the material is a glutaraldehyde and protein is present in said slurry.

14. The process of claim 1 wherein the material is a pretreatment agent and said fibers are natural cellulosic fibers.

15. The process of claim 1 wherein the material is an activating agent reactive with hydroxyl groups in the preform.

16. The process of claim 15 wherein said activating agent is a silane and the hydroxyl groups are on at least one of said fibers or glass microspheres.

17. The process of claim 16 wherein said fibers are glass fibers.

18. The process of claim 16 wherein said fibers are natural cellulosic fibers.

19. The process of claim 13 wherein said activating agent is one of 3-aminopropyltrimethoxysilane, 3-aminopropyltriethoxysilane, 3-glycidoxypropyltrimethoxysilane, 3-glycidoxypropyltriethoxysilane, (3-glycidoxypropyl)bis(trimethylsiloxy)methylsilane, (3-glycidoxypropyl)methyldiethoxysilane, (3-glycidoxypropyl)dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, or bis(3-triethoxysilylpropyl)tetrasulfide.

20. The process of claim 1 wherein drying said preform molds is accomplished by a dryer positioned within said basket of said centrifuge.

21. The process of claim 1 further comprising removing said preforms from said centrifuge by removing said plurality of solvent porous preform molds.

22. The process of claim 1 wherein said plurality of vehicle component performs are the same shape and form one of a bed liner, a body component, trim, an interior component, an undercar component, or a door.

* * * * *